United States Patent
Hitt et al.

(10) Patent No.: US 7,052,001 B2
(45) Date of Patent: May 30, 2006

(54) DUAL RATE LEAF SPRING SUSPENSION FOR UTILITY VEHICLE

(76) Inventors: Brian James Hitt, 157 E. Prospect St., Hartford, WI (US) 53027; Valer Stratulat, 50 Mooregate Crescent Suite 307, Kitchener, Ontario (CA) N2M 5G6; Donald Stoesz, 5 Henderson Road N.E., Langdon, Alberta (CA) T0J 1X1

( * ) Notice: Subject to any disclaimer, the term of this patent is extended or adjusted under 35 U.S.C. 154(b) by 0 days.

(21) Appl. No.: 10/777,968

(22) Filed: Feb. 12, 2004

(65) Prior Publication Data
US 2005/0179176 A1   Aug. 18, 2005

(51) Int. Cl.
*F16F 1/18*   (2006.01)

(52) U.S. Cl. .............. 267/47; 267/41; 280/124.17; 280/5

(58) Field of Classification Search ............... 267/48, 267/30, 259, 36.1–271, 158–165; 280/124.174, 280/124.175, 124.17
See application file for complete search history.

(56) References Cited

U.S. PATENT DOCUMENTS

| | | | | |
|---|---|---|---|---|
| 302,618 A | * | 7/1884 | Atkinson | 267/47 |
| 1,229,109 A | * | 6/1917 | McIntyre | 267/41 |
| 1,362,037 A | * | 12/1920 | Peterson | 267/45 |
| 1,423,153 A | * | 7/1922 | Richardson | 267/38 |
| 2,815,945 A | * | 12/1957 | Gabriel | 267/45 |
| 3,312,459 A | * | 4/1967 | Pence | 267/45 |
| 4,687,224 A | * | 8/1987 | Selzer | 280/124.175 |
| 4,750,718 A | | 6/1988 | Nickel | 267/49 |
| 4,919,399 A | * | 4/1990 | Selzer et al. | 267/31 |
| 4,988,080 A | | 1/1991 | Shah | 267/30 |
| 5,035,406 A | | 7/1991 | Sellers et al. | 267/48 |
| 5,217,248 A | | 6/1993 | Reast | 280/718 |
| 5,351,986 A | | 10/1994 | Hedenberg et al. | 280/712 |
| 6,220,580 B1 | | 4/2001 | Balczun | 267/7 |
| 6,361,026 B1 | | 3/2002 | Reast | 267/47 |
| 6,406,007 B1 | | 6/2002 | Wilson | 267/36.1 |
| 2002/0105117 A1 | | 8/2002 | Calvert | 267/36.1 |

FOREIGN PATENT DOCUMENTS

| | | |
|---|---|---|
| EP | 0 520 874 A1 | 12/1992 |
| GB | 1 3664 671 | 8/1974 |

* cited by examiner

*Primary Examiner*—Robert A. Siconolfi

(57) ABSTRACT

A dual rate leaf spring suspension supports a frame member over an axle of a small utility vehicle. The dual rate leaf spring suspension includes a full-length leaf spring and a half-length leaf spring. A spacer plate is the only connection point between the full-length leaf spring and the half-length leaf spring, which is positioned intermediate the full-length leaf spring and at one end of the half-length leaf spring.

15 Claims, 2 Drawing Sheets

DUAL RATE LEAF SPRING SUSPENSION FOR UTILITY VEHICLE

FIELD OF THE INVENTION

This invention relates generally to leaf spring suspensions for small utility vehicles, all terrain vehicles, and other similar small motor vehicles adapted to carry one or more passengers and/or cargo. More specifically, the invention relates to dual rate leaf springs for such vehicles.

BACKGROUND OF THE INVENTION

Leaf springs are used in suspensions for small utility vehicles having a gross vehicle weight of between about 500 pounds and about 3000 pounds, such as Gator™ utility vehicles available from Deere and Company of Moline, Ill., to dampen vibration, increase passenger comfort, and improve vehicle handling. A pair of leaf springs may support a vehicle frame over an axle. Each leaf spring has a linear load deflection curve, or spring rate.

Cargo carrying capacity may be an important feature for small utility vehicles. Cargo combined with optional attachments added to a utility vehicle, for example, can more than double the vehicle's weight. To accommodate the additional weight and yet maintain sufficient suspension travel while loaded, some utility vehicles may be "stiffly" sprung, i.e., have leaf springs with a very high spring rate. However, a high spring rate may increase the vibration and road irregularities transferred to the operator and passengers of the vehicle.

Leaf springs having a non-linear or stepped load deflection curve, i.e., two or more spring rates, have not been widely adopted in small utility vehicles. This is due, at least in part, to the complexity and cost of dual or variable rate leaf springs, especially for use in relatively inexpensive small utility vehicles. For example, dual or variable rate leaf springs may include multiple components which may involve significantly greater assembly time.

There is a need for a simple, inexpensive dual rate leaf spring suspension for a small utility vehicle. Additionally, there is a need for a dual rate leaf spring suspension that may replace conventional leaf spring suspensions without requiring replacement of other components of a small utility vehicle.

SUMMARY OF THE INVENTION

A dual rate leaf spring suspension is provided for a small utility vehicle having a full-length leaf spring and a half-length leaf spring. The full-length leaf spring has a first end, a second end, and an intermediate section between the first and second ends, the first end being pivotally connected to a small utility vehicle frame. The half-length leaf spring has a first end and a second end, the first end being pivotally connected to the small utility vehicle frame. A spacer plate may be positioned between the intermediate section of the full-length leaf spring and the second end of the half-length leaf spring, the spacer plate being the only connection point between the full-length leaf spring and the half-length leaf spring.

In the unloaded or lightly loaded condition, the first end of the half-length leaf spring is separated from the second end of the full-length leaf spring. In a heavy loaded condition, the first end of the half-length leaf may contact the second end of the full-length leaf spring.

This simple, inexpensive dual rate leaf spring suspension improves ride quality perceived by the driver and passenger, compared to a single rate leaf spring suspension. Full load-carrying capability is offered with the second, higher spring rate. The dual rate leaf spring suspension may have fewer parts, reduced assembly time, reduced complexity and lighter weight than multi-stack leaf springs. The dual rate leaf spring suspension may replace a conventional leaf spring suspension without exchanging or replacing other parts of a small utility vehicle.

DESCRIPTION OF THE PREFERRED EMBODIMENT

Figure 1:
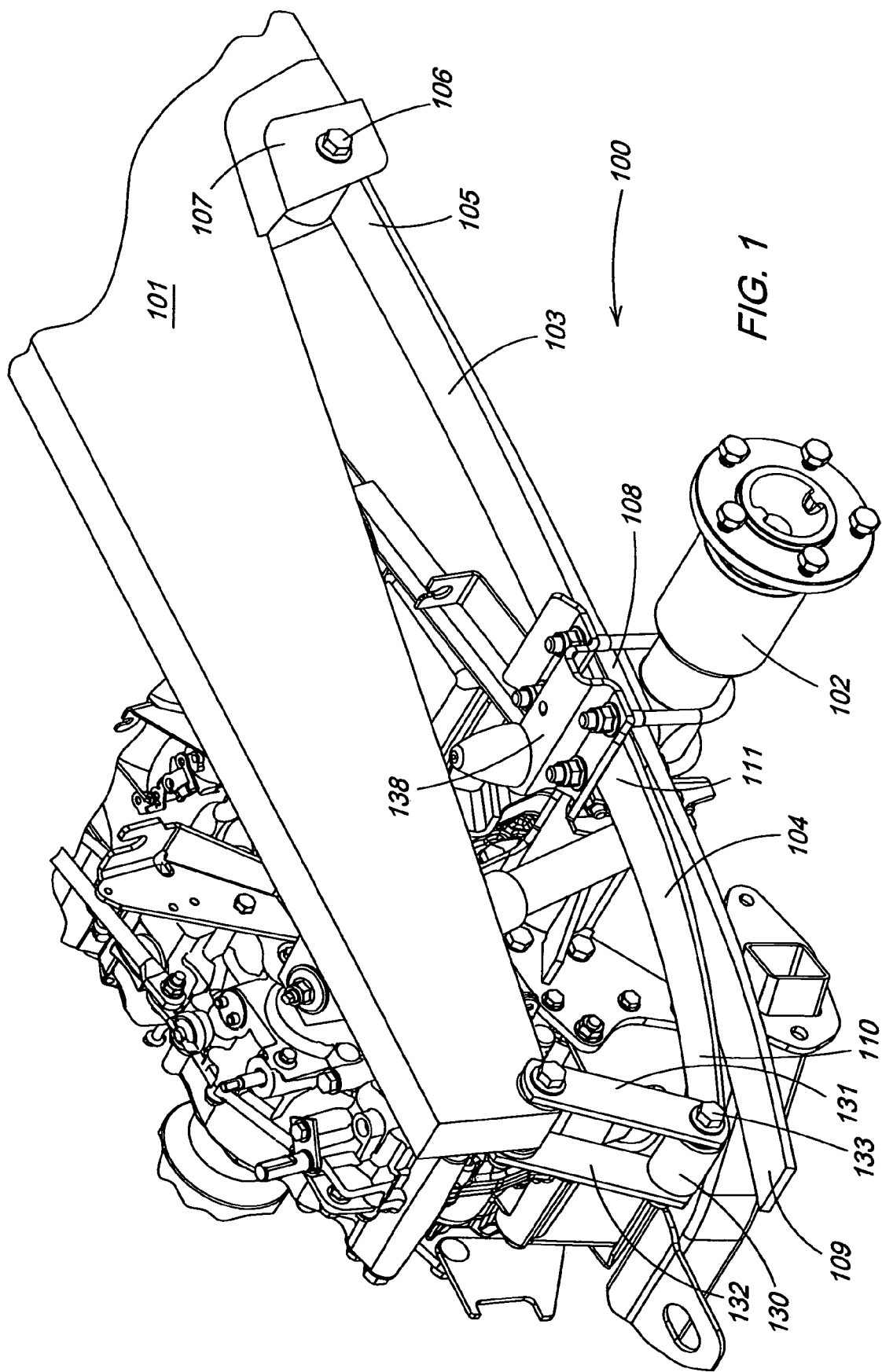
FIG. 1 is a right rear perspective view of a dual rate leaf spring suspension system for a small utility vehicle according to a first embodiment of the invention.
Figure 2:
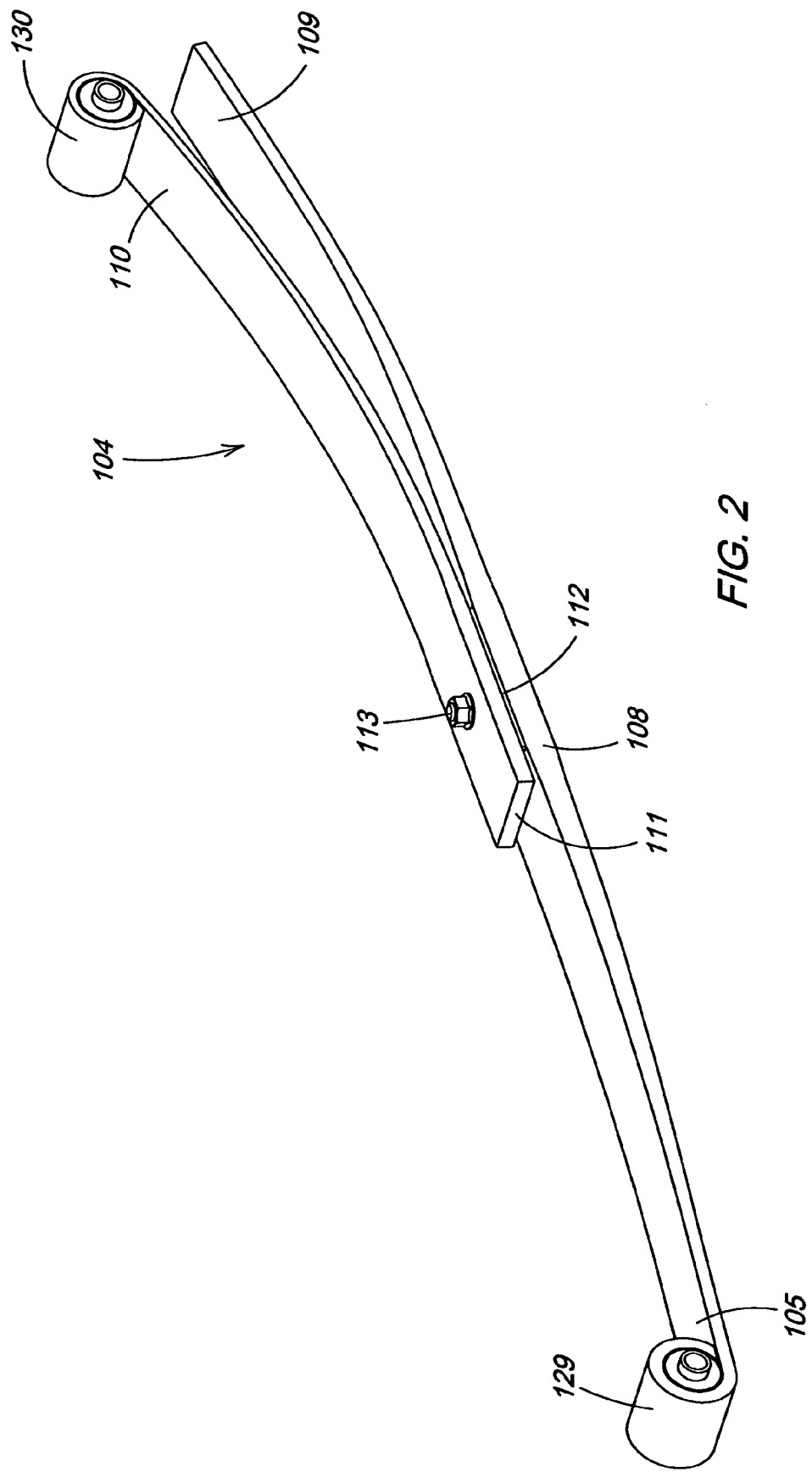
FIG. 2 is a perspective view of a dual rate leaf spring in a first embodiment of the invention.

In FIG. 1, a first embodiment of dual rate leaf spring suspension 100 is shown. The dual rate leaf spring suspension supports frame member 101 over axle 102 of a small utility vehicle. In one embodiment, the dual rate leaf spring suspension includes full-length leaf spring 103 and half-length leaf spring 104. Leaf springs 103 and 104 may be generally parabolic, and made from steel, fiber reinforced resinous material, or other materials well known to those skilled in the art. In one embodiment, each leaf spring may have a maximum thickness of about ⅝ inch, and the thickness may decrease at or near one or both ends of each leaf spring.

In one embodiment, the full-length leaf spring may be positioned below the half-length leaf spring. The full-length leaf spring may have first end 105 with rolled eye 129 to accept a rubber damper bushing. The first end of the full-length leaf spring may be pivotally connected to the frame by cross bolt 106 inserted through eye 129 and through corresponding holes in bracket 107 or a pair of plates welded to the frame member. The full-length leaf spring extends from first end 105, through intermediate section 108, to second end 109. In one embodiment, the first end of the full-length leaf spring may be oriented to face toward the front of a small utility vehicle and the second end may be oriented to face toward the back of the vehicle.

The intermediate section of the full-length leaf spring may include and/or provide a spring seat or attachment device 138 for connection to the axle of a small utility vehicle. The length measured from the first end of the full-length leaf spring to the spring seat may be about the same or less than the length measured from the second end of the full-length leaf spring to the spring seat. The second end of the full-length leaf spring may have a generally flat or generally planar shape, and may be disconnected, or unattached to, the frame of the small utility vehicle.

In one embodiment, the half-length leaf spring may not be longer than half the length of the full-length leaf spring. The term "half-length" in this application refers not only to leaf springs that are exactly one-half the length of the full-length leaf spring, but also to leaf springs that are somewhat shorter or longer than one-half the length of the full-length leaf spring. For example, in one embodiment of the invention, the half-length leaf spring is less than one-half the length of the full-length leaf spring.

The half-length leaf spring may have first end 110 with rolled eye 130 to accept a rubber damper bushing. The first end may be pivotally connected to a pair of plates 131, 132 called shackles, or a mounting bracket, by cross bolt 133 inserted through the eye and through corresponding holes in the pair of plates or bracket. The plates or bracket then may be connected to frame member 101. The half-length leaf spring may extend from first end 110 to second end 111, and the second end may be at or adjacent the intermediate section 108 of the full-length leaf spring. The second end of the half-length leaf spring may be attached to the axle of the small utility vehicle at or adjacent the intermediate section of the full-length leaf spring.

In one embodiment, spacer plate 112 may be positioned between the half-length leaf spring and full-length leaf spring, and may be located at or under the spring seat. In one embodiment, spacer plate 112 may be a metal plate having a thickness of about 3 mm, a width about the same or similar to the width of each of the two leaf springs, and a length between about one inch and about six inches. Spacer plate 112 serves as the only connection point between the full-length and half-length two leaf springs. Spacer plate 112 prevents contact between the two leaf springs, except at the working ends of the springs. It is preferred that contact be avoided or eliminated between the full-length leaf spring and half-length leaf spring, except between the first end of the half-length leaf and the second end of the full-length leaf spring in a heavy loading condition. The spacer plate separates the two leaves to accomplish this. In one embodiment, threaded fastener 113 may be inserted through corresponding holes in the full-length leaf spring, spacer plate, and half-length leaf spring, to hold each of the two leaf springs to the spacer plate.

In one embodiment, the half-length leaf spring provides a first spring rate for a light load or unloaded condition. For example, the half-length leaf spring may be used when a small utility vehicle carries one passenger and a light cargo load. In the light load or unloaded condition, the first end of the half-length leaf spring may be separated from the second end of the full-length leaf spring by between about one inch and about four inches, and preferably separated by about two inches. The half-length leaf may provide a first spring rate which may be about 30% of the total combined spring rate of the half-length and full-length leaf springs, which may be sufficient for light cargo loads. In one embodiment of the invention, the half-length leaf spring has a spring rate of about 180 lbs/inch.

In one embodiment, the full-length leaf spring may be used when enough weight is added to the vehicle to cause the first end 110 of the half-length leaf spring to contact the second end 109 of the full-length leaf spring. This may be referred to as a heavy loaded condition. In this condition, the half leaf and the full leaf may have a combined spring rate of about 550 lbs/inch.

Thus, the suspension provides two distinct spring rates. For example, a low spring rate may be used when the small utility vehicle carries a light load, which may be defined as less than 400 pounds; i.e., two 200 pound passengers, or one passenger plus cargo of 200 pounds. A higher spring rate may be used when the small utility vehicle carries a heavy load, which may be defined as over 400 pounds; i.e., two 200 pound passengers, plus cargo or one passenger plus cargo of more than 200 pounds. As will be clear to those skilled in the art, the terms "light load" and "heavy load" may be defined differently for different small utility vehicles, and for different leaf springs that may be used in accordance with this invention.

This simple, inexpensive dual rate leaf spring suspension may be used for small utility vehicles. Ride quality may be perceived by the driver and passenger as much improved over a single rate leaf spring suspension. Full load-carrying capability is offered with the second, higher spring rate. Compared to multi-stack leaf springs, the dual rate leaf spring suspension may have fewer parts, reduced assembly time, reduced complexity and lighter weight. Additionally, the dual rate leaf spring suspension may replace a conventional leaf spring suspension without exchanging or replacing other parts of a small utility vehicle.

Having described the preferred embodiment, it will become apparent that various modifications can be made without departing from the scope of the invention as defined in the accompanying claims.

The invention claimed is:

1. An apparatus comprising:
   a full-length leaf spring having a first end, a second end, and an intermediate section between the first and second ends, the first end pivotally connected to a frame of a small utility vehicle over an axle and the second end being detached from the frame and the axle;
   a half-length leaf spring having a first end and a second end, the first end pivotally connected to the frame;
   a spacer plate between the intermediate section of the full-length leaf spring and the second end of the half-length leaf spring, the spacer plate being the only connection point between the full-length leaf spring and the half-length leaf spring; the first end of the half-length leaf spring being spaced from the second end of the full-length leaf spring when the small utility vehicle has a first load condition; the first end of the half-length leaf spring contacting the second end of the full-length leaf spring when the small utility vehicle has a second load condition heavier than the first load condition.

2. The apparatus of claim 1 further comprising a threaded connector extending between the intermediate section of the full-length leaf spring, the spacer plate, and the second end of the half-length leaf spring.

3. The apparatus of claim 1 wherein the full-length leaf spring is positioned below the half-length leaf spring.

4. The apparatus of claim 1 further comprising the axle mounted intermediate the full-length leaf spring and at the second end of the half-length leaf spring.

5. The apparatus of claim 1 wherein the spacer plate has a thickness less than either the thickness of the full-length leaf spring or the thickness of the half-length leaf spring.

6. The apparatus of claim 1 wherein the full-length leaf spring further comprises an eye at the first end thereof.

7. The apparatus of claim 1 wherein the half-length leaf spring further comprises an eye at the first end thereof.

8. An apparatus comprising:
   a half-length leaf spring with a first end pivotally connected to a pair of plates connected to a frame member of a vehicle and a second end attached to an axle of the vehicle;
   a full-length leaf spring under the half-length leaf spring with a first end pivotally connected to the frame member and a second end detached from the frame member;
   the first end of the half-length leaf spring being spaced from the second end of the full-length leaf spring in a first load condition, the first end of the half length leaf spring contacting the second end of the full-length leaf spring in a second load condition heavier than the first load condition.

9. The apparatus of claim 8 further comprising a spacer plate between the half-length leaf spring and the full-length leaf spring.

10. An apparatus comprising:
a dual rate leaf spring suspension supporting a vehicle frame over an axle, the suspension having a first leaf spring and a second leaf spring, the first leaf spring being longer than the second leaf spring, each of the first and second leaf springs having one eye pivotally connected to the vehicle frame, the first leaf spring and the second leaf spring having only one connection point therebetween, the connection point being directly above the axle, the first leaf spring having one end that is unattached to the vehicle frame or axle.

11. The apparatus of claim 10 further comprising a spacer plate between the first leaf spring and the second leaf spring.

12. The apparatus of claim 10 wherein the first leaf spring is below the second leaf spring.

13. The apparatus of claim 10 wherein the connection point is intermediate the first leaf spring and at one end of the second leaf spring.

14. The apparatus of claim 10 wherein the first leaf spring is at least twice the length of the second leaf spring.

15. The apparatus of claim 10 wherein the second leaf spring has an end that is spaced from the first leaf spring in an unloaded condition.

* * * * *